(12) United States Patent
Lepperdinger

(10) Patent No.: US 10,060,731 B2
(45) Date of Patent: Aug. 28, 2018

(54) OPTICAL POSITION-MEASURING DEVICE

(71) Applicant: DR. JOHANNES HEIDENHAIN GmbH, Traunreut (DE)

(72) Inventor: Gotthard Lepperdinger, St. Georgen (AT)

(73) Assignee: DR. JOHANNES HEIDENHAIN GmbH

( * ) Notice: Subject to any disclaimer, the term of this patent is extended or adjusted under 35 U.S.C. 154(b) by 0 days.

(21) Appl. No.: 15/823,604

(22) Filed: Nov. 28, 2017

(65) Prior Publication Data

US 2018/0172433 A1    Jun. 21, 2018

(30) Foreign Application Priority Data

Dec. 20, 2016  (EP) ..................... 16205387

(51) Int. Cl.
| | |
|---|---|
| *G01B 11/14* | (2006.01) |
| *G01D 5/347* | (2006.01) |
| *G02B 26/10* | (2006.01) |
| *G01D 5/38* | (2006.01) |

(52) U.S. Cl.
CPC ......... *G01B 11/14* (2013.01); *G01D 5/34723* (2013.01); *G01D 5/38* (2013.01); *G02B 26/106* (2013.01)

(58) Field of Classification Search
CPC ........ G01B 11/14; G02B 26/106; G01D 5/38; G01D 5/34723
See application file for complete search history.

(56) References Cited

U.S. PATENT DOCUMENTS

| | | | |
|---|---|---|---|
| 4,746,792 A | 5/1988 | Dil | |
| 5,576,537 A | 11/1996 | Holzapfel et al. | |
| 6,472,658 B2 * | 10/2002 | Mayer | G01D 5/2457 250/231.14 |
| 6,552,810 B1 | 4/2003 | Hermann et al. | |

FOREIGN PATENT DOCUMENTS

| | | |
|---|---|---|
| DE | 19754595 B4 | 6/1999 |
| EP | 0638784 A2 | 2/1995 |
| EP | 1028309 A1 | 8/2000 |

* cited by examiner

*Primary Examiner* — Hwa Lee
(74) *Attorney, Agent, or Firm* — Leydig, Voit & Mayer, Ltd.

(57) ABSTRACT

An optical position-measuring device includes a measuring graduation having a measuring graduation period and a scanner movable relative to the measuring graduation. The scanner projects a light pattern having alternating bright and dark regions with a light pattern period onto the measuring graduation. The measuring graduation period differs from the light pattern period such that interaction of the light pattern with the measuring graduation produces a vernier pattern having bright regions and dark regions. The measuring graduation is a phase grating having a line-to-space ratio different from 1:1 and a phase shift between lines and spaces selected such that the zeroth diffraction order is suppressed. The position-measuring device is configured such that, at a position at which the zeroth diffraction order of a bright region is suppressed, a higher diffraction order is deflected and impinges on a detector array in a bright region of the vernier pattern.

10 Claims, 4 Drawing Sheets

OPTICAL POSITION-MEASURING DEVICE

CROSS-REFERENCE TO PRIOR APPLICATION

Priority is claimed to European Patent Application No. EP 16205387.0, filed on Dec. 20, 2016, the entire disclosure of which is hereby incorporated by reference herein.

FIELD

The present invention relates to an optical position-measuring device.

BACKGROUND

EP 1 028 309 A1 discloses an optical position-measuring device of the above-mentioned type. By interaction of a periodic light pattern with a periodic measuring graduation, a vernier fringe pattern is produced in a subsequent detection plane. To this end, the period of the periodic light pattern differs slightly from the period of the measuring graduation, hereinafter called "measuring graduation period." The period of the vernier fringe pattern generated therefrom (hereinafter called "vernier period"), is greater than the period of the light pattern and also greater than the measuring graduation period. The measuring graduation is configured as an amplitude grating, and the line-to-space ratio of the measuring graduation is 1:1.

SUMMARY

In an embodiment, the present invention provides an optical position-measuring device for measuring a relative position of two objects that are movable relative to one another in a measuring direction. The optical position-measuring device including a measuring graduation having a measuring graduation period and a scanner that is movable relative to the measuring graduation in the measuring direction. The scanner is configured to project a light pattern having bright and dark regions alternating in the measuring direction with a light pattern period onto the measuring graduation. The measuring graduation period differs from the light pattern period such that interaction of the light pattern with the measuring graduation produces a vernier pattern having bright regions and dark regions which are scanned by a detector array. The measuring graduation is a phase grating having a line-to-space ratio that is different from 1:1 and having a phase shift between lines and spaces that is selected such that the zeroth diffraction order is suppressed. The position-measuring device is configured such that, at a position at which the zeroth diffraction order of a bright region of the incident light pattern is suppressed, at least one higher diffraction order is deflected and impinges on the detector array in one of the bright regions of the vernier pattern.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
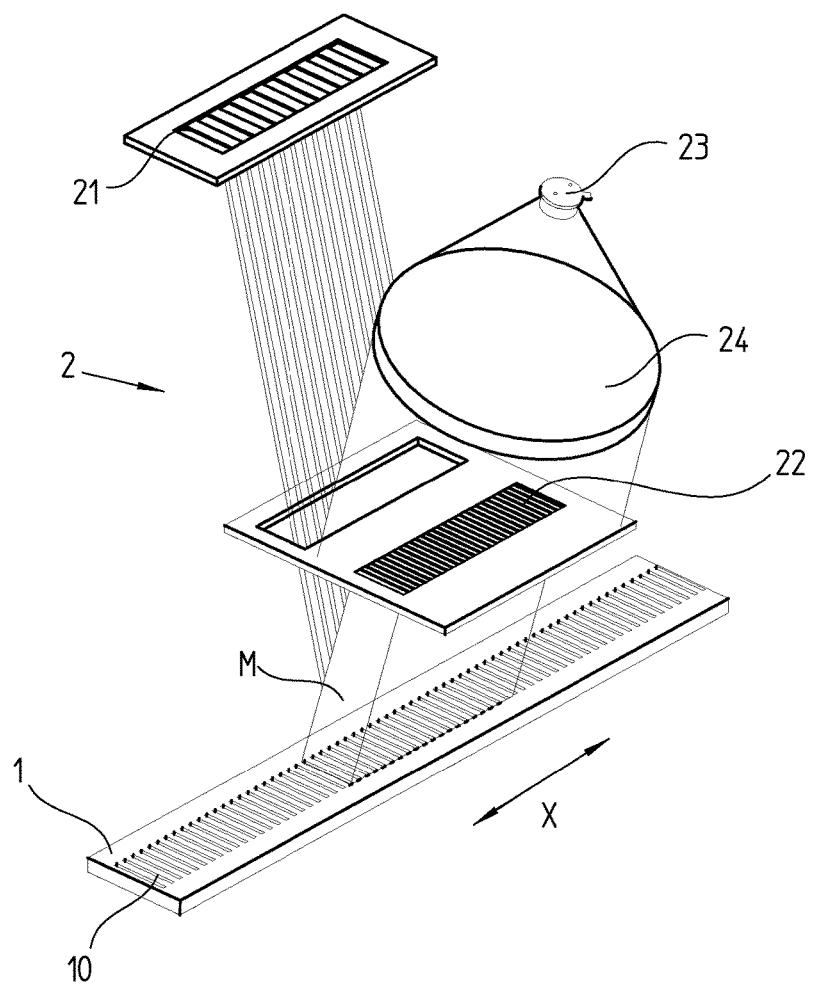
FIG. 1 shows a perspective view of a first optical position-measuring device designed in accordance with an embodiment of the present invention.

An aspect of the present invention provides an optical position-measuring device that produces a vernier fringe pattern with an improved signal-to-noise ratio.

According to an embodiment, an optical position-measuring device for measuring the relative position of two objects that are movable relative to one another in the measuring direction includes a measuring graduation and a scanning unit that is movable relative to the measuring graduation in the measuring direction. The scanning unit is configured to project onto the measuring graduation a light pattern having bright and dark regions alternating in the measuring direction with a light pattern period. The measuring graduation has a measuring graduation period that differs slightly from the light pattern period such that interaction of the light pattern with the measuring graduation produces a vernier pattern having bright regions and dark regions which are scanned by a detector array. The measuring graduation is a phase grating whose line-to-space ratio is different from 1:1 and whose phase shift between lines and spaces is selected such that the zeroth diffraction order is suppressed. Furthermore, the position-measuring device is configured such that, at the position at which the zeroth diffraction order of a bright region of the incident light pattern is suppressed, at least one higher diffraction order is deflected and impinges on the detector array in one of the bright regions of the vernier pattern.

The terms "line" and "space" of the phase grating refer to two regions within a measuring graduation period which produce different delays in the incident light so as to obtain the required phase shift. The phase shift is set in a known manner by path differences and/or by differences in the refractive index of the material that the light must pass through.

Advantageously, embodiments of the present invention increase the intensity of the bright regions of the vernier pattern. Because of this signal increase, a stronger useful signal is generated, which increases the measurement accuracy of the position-measuring device.

The term "light" also includes radiation having a wavelength in the invisible range.

Preferably, the line of each measuring graduation period is wider than the space, and the line is wider than a bright region of the light pattern. This ensures that when a bright region of the light pattern impinges centrally on this line, this bright region is fully used to generate the bright region of the vernier pattern, either by total transmission or by total reflection.

Alternatively, the space of each measuring graduation period is wider than the line, and the space is wider than a bright region of the light pattern. In this case, it is ensured that when a bright region of the light pattern impinges centrally on this space, this bright region is fully used to generate the bright region of the vernier pattern, either by total transmission or by total reflection.

In particular, the line of each measuring graduation period is wider than the space of the measuring graduation period, and the width of the space of the measuring graduation period is 50% of the light pattern period or, alternatively, the space is in each case wider than the line of the phase grating, and the width of the line is 50% of the light pattern period.

If the lines and spaces have identical optical properties (transmission or reflection), this ensures that the zeroth diffraction order is completely extinguished by destructive interference.

Advantageously, the line-to-space ratio or the space-to-line ratio of the phase grating is 1:3.

A particularly simple design is obtained for the position-measuring device when the scanning unit includes a transmitter device and a grating, the transmitter device being configured to generate a collimated light beam directed onto the grating, and the collimated light beam producing the light pattern by interaction with the grating.

The grating may be an amplitude grating, but preferably the grating is a phase grating. However, alternatively, the grating may also be a mixed amplitude/phase grating.

The phase shift of the measuring graduation configured as a phase grating is, in particular, $\lambda/2$, where $\lambda$=wavelength of the light of the incident light pattern.

Preferably, the detector array includes a plurality of detectors for scanning the vernier pattern and for generating K scanning signals that are phase-shifted by 360°/K relative to each other, it holding for the center-to-center distance $X_K$ between adjacent detectors that:

$$X_K = P_V/K,$$

where $$1/P_V = |1/P_T - 1/P_M|$$

$P_V$=vernier period
$P_T$=measuring graduation period
$P_M$=light pattern period
K=positive integer For purposes of signal increase and averaging, several $K^{th}$ detectors of the detector array may be connected together so as to produce a resultant summed scanning signal.

Figure 2:
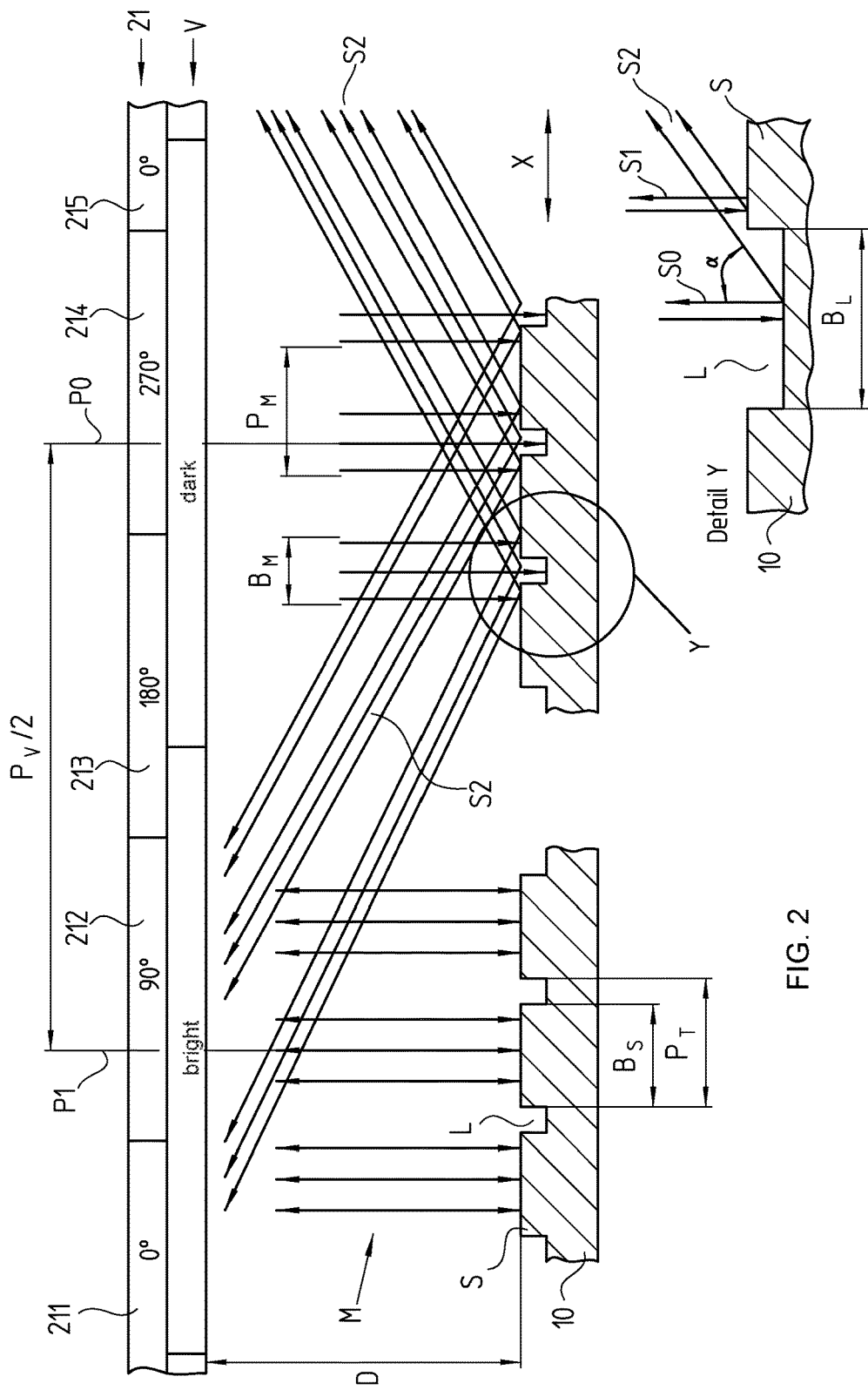
FIG. 2 shows the basic configuration and the scanning beam path of the position-measuring device according to FIG. 1.
Figure 3:
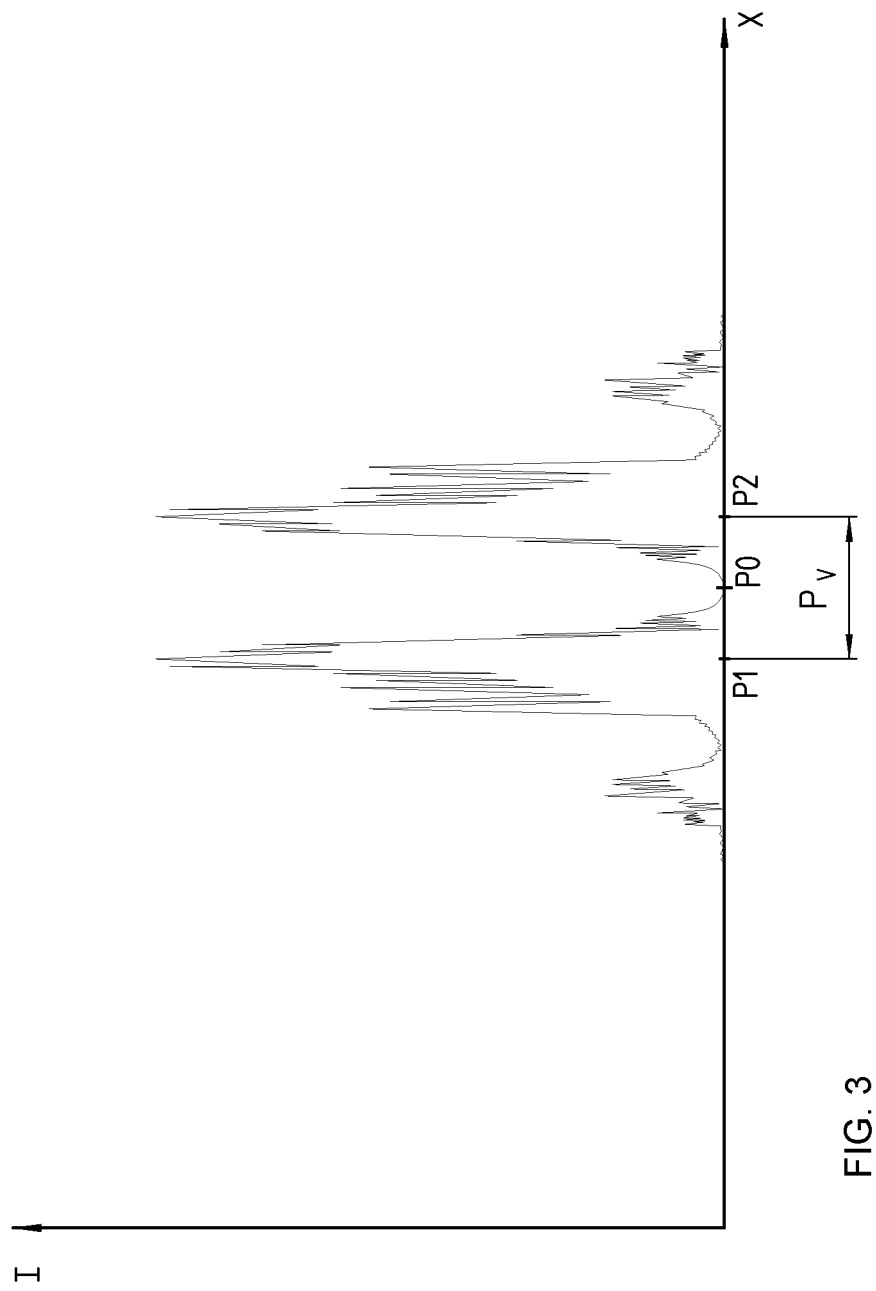
FIG. 3 shows the diffraction pattern forming in the detector plane of the position-measuring device.

FIGS. 1 and 2 show a first exemplary embodiment of the present invention, and FIG. 3 shows the diffraction pattern formed in this first exemplary embodiment.

This optical position-measuring device includes a measuring graduation 10 that is scanned by a scanning unit 2 in what is known as reflected-light mode for position measurement purposes. The reflective measuring graduation 10 is applied or attached to a scale 1 in a known manner. In order to measure the position of two objects that are movable relative to one another in the measuring direction X, scale 1 is attached to one of the two objects, and scanning unit 2 is attached to the other of the two relatively movable objects.

Scanning unit 2 is configured to project a periodic light pattern M onto measuring graduation 10. The period of this light pattern M is hereinafter referred to as light pattern period $P_M$. The generation of position-dependent scanning signals is based on the interaction of periodic light pattern M with measuring graduation 10 for producing a vernier pattern V. For this purpose, measuring graduation 10 has a measuring graduation period $P_T$ that differs slightly from light pattern period $P_M$, so that a vernier pattern V is produced on detector array 21, which vernier pattern has a period $P_V$ significantly larger than light pattern period $P_M$ and measuring graduation period $P_T$. The so-produced vernier pattern V is oriented parallel to the graduation lines of measuring graduation 10. In the event of a relative movement between scanning unit 2 and measuring graduation 10, periodic light pattern M undergoes a displacement-dependent modulation, thereby forming the periodic vernier pattern V having bright regions and dark regions. Vernier pattern V is scanned by detector array 21 to determine the respective relative position of measuring graduation 10 and scanning unit 2.

For the vernier period $P_V$ (period of the vernier pattern V formed), the following holds:

$$1/P_V = |1/P_T - 1/P_M|$$

where $P_T$=measuring graduation period (period of measuring graduation 10)
$P_M$=light pattern period (period of light pattern M)

Light pattern M can be produced in different ways. In the simplest case, the position-measuring device is a two-grating encoder, in which light pattern M is produced by a grating 22 that is illuminated with collimated light. In order to provide collimated illumination, a light source 23 and optics 24 are provided. Grating 22 is, for example, an amplitude grating having a periodic sequence of opaque lines and transparent spaces. The opaque lines are formed by a coating of opaque material on a transparent substrate, which may in particular be a glass substrate. Preferably, however, grating 22 is a phase grating. However, alternatively, grating 22 may also be a mixed amplitude/phase grating.

The period of grating 22 corresponds to the required light pattern period $P_M$, and the line-to-space ratio of grating 22 is selected to be 1:1. Thus, the width of a space of grating 22 corresponds to the width $B_M$ of a bright region of periodic light pattern M and is $P_M/2$.

The radiation emitted by the monochromatic or at least narrow-band light source 23 is collimated by optics 24 and passes through the transparent spaces of grating 22. Examples of a suitable light source 23 are, in particular, an LED or a different narrow-band light source 23.

In accordance with an embodiment of the present invention, measuring graduation 10 is a phase grating; in the first exemplary embodiment, a reflective phase grating. In order to maximize the intensity of the bright regions of vernier pattern V, an embodiment of the present invention uses several properties of this phase grating, namely, the following points 1-3, which will be discussed further in the following:

Geometrical Optics:
1. reflection in the case of a reflective phase grating and transmission (straight-line propagation) in the case of a transmission grating Physical Optics:
2. destructive interference
3. diffraction Regarding point 1: This effect is based on pure reflection of a beam that is incident on a planar surface of the phase grating and is achieved when the line-to-space ratio of the phase grating differs from 1:1. It is thereby achieved that lines S each have a width BS greater than the width BM of a bright region of light pattern M, or that spaces L each have a width BL greater than the width BM of a bright region of light pattern M. In the example shown, within a measuring graduation period PM, the lines S of the phase grating have a width BS greater than the width BM of a bright region of light pattern M; the following holds:

$$B_S > B_M$$

Thus, measuring graduation 10 is operative to modulate the reflection of incident light pattern M as a function of position. Therefore, in the instantaneous position P1 shown in FIG. 2, incident light pattern M impinges on measuring graduation 10 in a region which is shown on the left and in which the entire incident width $B_M$ of the bright region of light pattern M is reflected by measuring graduation 10 and strikes detector array 21. This region of the vernier pattern V incident on detector array 21 is therefore referred to as bright region and designated as "bright" in FIG. 2.

Regarding point 2: This uses the destructive interference of a sub-beam S1 that is incident on and reflected by a line S of the phase grating with a sub-beam S0 that is incident on and reflected by a space L of the phase grating.

To this end, the phase shift between line S and space L of the phase grating is selected such that the zeroth diffraction order is suppressed. For this purpose, the phase shift phase shift between line S and space L of the phase grating which phase shift is effective for incident light pattern M is $\lambda/2$, with $\lambda$ being the wavelength of light pattern M.

In the instantaneous position P0 shown in FIG. 2, due to the different periods of light pattern M and measuring graduation 10, a portion of light pattern M impinges on measuring graduation 10 in a region which is shown on the right in FIG. 2. In position P0, the bright region of incident light pattern M is influenced in terms of phase and diffraction. This region P0 is spaced from region P1 by half a vernier period $P_V$ in measuring direction X. With regard to the phase, a destructive interference occurs, causing extinction of the zeroth diffraction order. Thus, no light strikes detector array 21 in location P0. This region of vernier pattern V is therefore referred to as dark region and designated as "dark" in FIG. 2.

Provided that line S and space L of measuring graduation 10 have identical reflective properties, the following should also hold for total destructive interference: The line S of each measuring graduation period PT is wider than the space L of measuring graduation period PT, and the width BL of space L is 50% of light pattern period PM, or the space L of each measuring graduation period PT is wider than the line S of measuring graduation period PT, and width BS of line S is 50% of light pattern period PM.

In the example, the space-to-line ratio of measuring graduation 10, and thus of the phase grating, is 1:3. The same effect is achieved when the space-to-line ratio of the phase grating is selected to be 1:3.

Regarding point 3: This uses the diffraction of a beam incident on the phase grating, whereby the intensity of the bright regions of vernier pattern V, which intensity is obtained by reflection (as explained above under point 1), is increased by position-dependent modulation of the diffraction at the phase grating.

As indicated earlier herein, due to the different periods of light pattern M and measuring graduation 10, a portion of light pattern M impinges on measuring graduation 10 in a region which is shown on the right in FIG. 2. In this region of measuring graduation 10, a bright region of incident light pattern M is influenced in terms of phase and diffraction.

As for diffraction, at position P0, at least one of the higher diffraction orders N (N≠0) is deflected in measuring direction X in such a way that it strikes detector array 21 at position P1; i.e., in a bright region of vernier pattern V. This at least one higher diffraction order N impinges on detector array 21 in the pattern of vernier period $P_V$. Region P0 is spaced from region P1 by half a vernier period $P_V$ in measuring direction X.

With regard to the dimensioning of the position-measuring device, several parameters play a role: For the diffraction angle $\alpha$ of the $n^{th}$ diffraction order, the following holds:

$$\sin \alpha = N^* \lambda / P_T$$

For the small diffraction angles $\alpha$ that are relevant in practice, the following holds:

$$\alpha = N^* \lambda / P_T$$

Since the beam that is diffracted by diffraction angle $\alpha$ at position P0 must strike detector array 21 at an offset of $P_V/2$, the following also holds:

$$D^* \alpha = P_V/2$$

and thus, the following holds for the distance D between measuring graduation 10 and detector array 21:

$$D = P_V {}^* P_T / (2^* N^* \lambda)$$

In FIG. 2, negative and positive diffraction orders of the same order are denoted identically by S2 because the same conditions apply for each of the positive and negative orders originating from instantaneous position P0.

The proper functioning of the position-measuring device according to the present invention was demonstrated in a test setup. The following parameters were selected:
$P_M$=20.5128 μm
$P_T$=20.00 μm
$P_V$=800 μm
$\lambda$=860 nm
line-to-space ratio of measuring graduation 10=3:1

If the second diffraction order N=2 is to be used in accordance with the present invention, a diffraction angle $\alpha$ of about 5° results for this diffraction order.

Under these conditions, a value of about 4.5 mm results for the distance D between measuring graduation 10 and detector array 21. It has been found that even when distance D changes, the beams S2 diffracted at measuring graduation 10 still increase the intensity of the bright regions of vernier pattern V. In the example, distance D can assume values from about 3 mm to 6 mm; i.e., a tolerance of ±1.5 mm is permitted for D.

FIG. 3 shows the diffraction pattern of the diffraction beams diffracted at measuring graduation 10. The intensity I of the diffraction orders is plotted as a function of the positions X, with positions P0 and P1 corresponding to the instantaneous positions shown in FIG. 2. Additionally shown in FIG. 3 is position P2, which is the position spaced from P1 by PV; i.e., the center of the next bright region of vernier pattern V.

In order to increase the intensity of the bright regions of the vernier pattern, even and/or odd diffraction orders (N≠0) can be used and accounted for in the design.

Detector array 21 is formed of a plurality of detectors 211, 212, 213, 214, 215 disposed adjacent one another in measuring direction X. In order to generate K mutually phase-shifted scanning signals, K detector elements 211, 212, 213, 214 are disposed within one vernier period $P_V$.

In general terms, a detector array 21 including K detector elements is provided for scanning vernier pattern V and for generating K scanning signals that are phase-shifted by 360°/K relative to each other, the center-to-center distance between adjacent detector elements being $X_K = P_V/K$, where $$1/P_V = |1/P_T - 1/P_M|$$

$P_V$=vernier period
$P_T$=measuring graduation period
$P_M$=light pattern period If four scanning signals phase-shifted by 90° relative to each other are to be generated, then K=4 detector elements 211, 212, 213, 214 need to be disposed within one vernier period $P_V$.

Detector elements 211, 215 of detector array 21 which produce in-phase scanning signals during the scanning of the vernier pattern V may be electrically connected together and summed to produce a resultant scanning signal. In other words: several $K^{th}$ detectors 211, 215 of detector array 21 may be connected together, respectively, so as to produce a resultant summed scanning signal.

Figure 4:
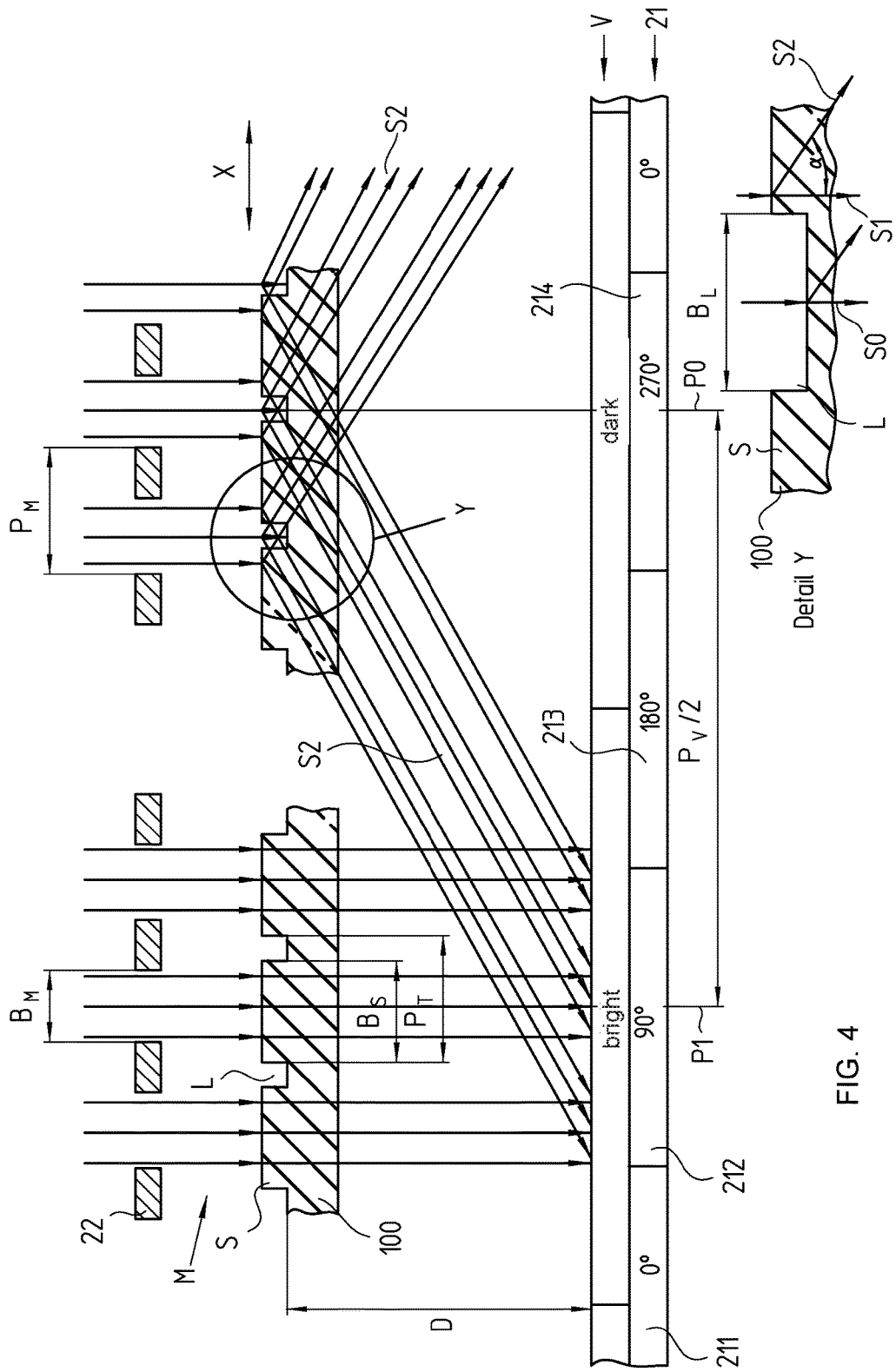
FIG. 4 shows a second exemplary embodiment of an optical position-measuring device designed in accordance with the present invention.

In the first exemplary embodiment, measuring graduation 10 is configured as a reflective phase grating. FIG. 4 shows that the present invention can also be used in a transmitted-light configuration, in which case measuring graduation 100 is configured as a transparent phase grating.

In the case of this second exemplary embodiment, the same conditions apply as described for the first exemplary embodiment, and therefore only the measuring graduation has been given a different reference numeral, whereas the other reference numerals have been adopted.

When a reflection grating is used as the phase grating (measuring graduation 10), the bright regions of vernier pattern V are formed at the positions P1 of the phase grating at which the bright regions of light pattern M are completely reflected. In contrast, when a transmission grating is used as the phase grating (measuring graduation 100), the bright regions of vernier pattern V are formed at the positions P1 at which the bright regions of light pattern M pass completely through.

When a reflection grating is used as the phase grating (measuring graduation 10), the dark regions of vernier pattern V are formed at the positions P0 of the phase grating at which the bright regions of light pattern M are extinguished by destructive interference of reflected sub-beams S0, S1 (FIG. 2). In contrast, when a transmission grating is used as the phase grating (measuring graduation 100), the dark regions of vernier pattern V are formed at the positions P0 at which the bright regions of light pattern M are extinguished by destructive interference of transmitted sub-beams S0, S1 (FIG. 4).

When a reflection grating is used as the phase grating (measuring graduation 10), the bright regions of vernier pattern V which are formed at positions P1, P2 of the phase grating are intensified by diffraction beams which are diffracted by reflection at positions P0 of the phase grating. In contrast, when a transmission grating is used as the phase grating (measuring graduation 100), the bright regions of vernier pattern V which are formed at positions P1, P2 of the phase grating are intensified by diffraction beams which are diffracted by transmission at positions P0 of the phase grating.

The present invention can be used in length-measuring devices for measuring linear movements and positions as well as in angle-measuring devices for measuring rotational movements and positions.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An optical position-measuring device for measuring a relative position of two objects that are movable relative to one another in a measuring direction, the optical position-measuring device comprising:
    a measuring graduation having a measuring graduation period; and
    a scanner that is movable relative to the measuring graduation in the measuring direction, the scanner being configured to project a light pattern having bright and dark regions alternating in the measuring direction with a light pattern period onto the measuring graduation, the measuring graduation period differing from the light pattern period such that interaction of the light pattern with the measuring graduation produces a vernier pattern having bright regions and dark regions which are scanned by a detector array,
    wherein the measuring graduation is a phase grating having a line-to-space ratio that is different from 1:1 and having a phase shift between lines and spaces that is selected such that the zeroth diffraction order is suppressed, and
    wherein the position-measuring device is configured such that, at a position at which the zeroth diffraction order of a bright region of the incident light pattern is suppressed, at least one higher diffraction order is deflected and impinges on the detector array in one of the bright regions of the vernier pattern.

2. The optical position-measuring device as recited in claim 1, wherein:
    the line of each measuring graduation period is wider than the space, and the line is wider than a bright region of the light pattern; or
    the space of each measuring graduation period is wider than the line, and the space is wider than a bright region of the light pattern.

3. The optical position-measuring device as recited in claim 1, wherein:
    the line of each measuring graduation period is wider than the space of the measuring graduation period, and the width of the space of the measuring graduation period is 50% of the light pattern period; or
    the space is in each case wider than the line of the phase grating, and the width of the line is 50% of the light pattern period.

4. The optical position-measuring device as recited in claim 1, wherein the line-to-space ratio or the space-to-line ratio of the phase grating is 1:3.

5. The optical position-measuring device as recited in claim 1, wherein the phase shift of the measuring graduation is $\lambda/2$.

6. The optical position-measuring device as recited in claim 1, wherein the scanner includes a transmitter and a grating, the transmitter being configured to generate a collimated light beam directed onto the grating, the collimated light beam producing the light pattern by interaction with the grating.

7. The optical position-measuring device as recited in claim 6, wherein the line-to-space ratio of the grating for generating the light pattern is 1:1.

8. The optical position-measuring device as recited in claim 6, wherein the grating generating the light pattern is an amplitude grating or a phase grating.

9. The optical position-measuring device as recited in claim 1, wherein the detector array includes a plurality of detectors configured to scan the vernier pattern and to generate K scanning signals that are phase-shifted by 360°/K relative to each other, it holding for a center-to-center distance XK between adjacent detectors that:

$X_K = P_V/K$, where:

$1/P_V = |1/P_T - 1/P_M|$ $P_V$=vernier period
$P_T$=measuring graduation period
$P_M$=light pattern period.

10. The optical position-measuring device as recited in claim 9, wherein several $K^{th}$ detectors of the detector array are respectively connected together so as to produce a resultant summed scanning signal.

* * * * *